(12) United States Patent
Kogure (10) Patent No.: US 11,054,102 B2
(45) Date of Patent: Jul. 6, 2021

(54) COLLIMATOR LENS, LIGHT RADIATION DEVICE, AND VEHICLE LIGHTING APPARATUS

(71) Applicant: Stanley Electric Co., Ltd., Tokyo (JP)

(72) Inventor: Shinya Kogure, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/612,730

(22) PCT Filed: May 18, 2018

(86) PCT No.: PCT/JP2018/019305
§ 371 (c)(1),
(2) Date: Nov. 11, 2019

(87) PCT Pub. No.: WO2018/216616
PCT Pub. Date: Nov. 29, 2018

(65) Prior Publication Data
US 2020/0200351 A1    Jun. 25, 2020

(30) Foreign Application Priority Data

May 24, 2017 (JP) .............................. JP2017-102639

(51) Int. Cl.
*F21S 41/20* (2018.01)
*F21S 43/31* (2018.01)
(Continued)

(52) U.S. Cl.
CPC ........... *F21S 41/285* (2018.01); *F21S 41/321* (2018.01); *F21S 43/26* (2018.01); *F21S 43/31* (2018.01);
(Continued)

(58) Field of Classification Search
CPC ........ F21S 41/285; F21S 43/31; F21S 41/321; F21S 43/26; F21S 41/645; F21S 41/675;
(Continued)

(56) References Cited

U.S. PATENT DOCUMENTS

2010/0271598 A1* 10/2010 Murayama ........... G03B 21/208
353/38
2011/0205745 A1* 8/2011 Conzatti ................... B66F 9/08
362/341
(Continued)

FOREIGN PATENT DOCUMENTS

JP     2005-183090 A       7/2005
JP     2005183090 A    *  7/2005
(Continued)

OTHER PUBLICATIONS

International Search Report of the International Search Report for PCT/JP2018/019305 dated Aug. 7, 2018.

*Primary Examiner* — Kevin Quarterman
(74) *Attorney, Agent, or Firm* — Kenealy Vaidya LLP (57) ABSTRACT

A collimator lens in use for a vehicle lighting apparatus includes: an incident surface which allows incident light to become primary light that passes through an inside of the collimator lens; and an emission surface that is configured to emit secondary light parallel to an optical axis of the collimator lens, wherein a diffusion angle of a horizontal component of the primary light is larger than a diffusion angle of a component in a vertical direction of the primary light.

16 Claims, 6 Drawing Sheets

(51) Int. Cl.
*F21S 41/32* (2018.01)
*F21S 43/20* (2018.01)
*F21V 5/04* (2006.01)
*F21V 7/08* (2006.01)
*G02B 5/02* (2006.01)
*G02B 27/30* (2006.01)

(52) U.S. Cl.
CPC .................. *F21V 5/04* (2013.01); *F21V 7/08* (2013.01); *G02B 5/0278* (2013.01); *G02B 5/0294* (2013.01); *G02B 27/30* (2013.01)

(58) Field of Classification Search
CPC ........ F21S 41/43; F21S 41/255; F21S 41/322; F21S 41/147; F21V 5/04; F21V 7/08; G02B 5/0278; G02B 5/0294; G02B 27/30; G02B 19/00; F21W 2102/135
See application file for complete search history.

(56) References Cited

U.S. PATENT DOCUMENTS

2013/0114283 A1 5/2013 Kawanobe et al.
2017/0068098 A1* 3/2017 Chern ................ G02B 27/0927

FOREIGN PATENT DOCUMENTS

| JP | 2011-243366 A | 12/2011 |
| JP | 2012-507823 A | 3/2012 |
| JP | 2013-101881 A | 5/2013 |
| JP | 2016-115412 A | 6/2016 |

* cited by examiner

FIG. 6

COLLIMATOR LENS, LIGHT RADIATION DEVICE, AND VEHICLE LIGHTING APPARATUS

CROSS-REFERENCE TO RELATED APPLICATIONS

This application is a U.S. National Stage Application under 35 U.S.C § 371 of International Patent Application No. PCT/JP2018/019305 filed May 18, 2018, which claims the benefit of priority to Japanese Patent Application No. 2017-102639 filed May 24, 2017, the disclosures of all of which are hereby incorporated by reference in their entireties.

TECHNICAL FIELD

The present invention relates to a collimator lens, a light radiation device, and a vehicle lighting apparatus.

Priority is claimed on Japanese Patent Application No. 2017-102639, filed on May 24, 2017, the contents of which are incorporated herein by reference.

BACKGROUND

Patent Document 1 discloses a vehicle headlight unit that includes a liquid crystal element for performing selective light irradiation to a frontward direction of a vehicle. In the vehicle headlight unit, by a parallel optical system, light that is incident on the liquid crystal element is made to be parallel light. In this way, in the related art, a vehicle headlight unit is known in which a parallel optical system (collimator lens) is provided in an optical path.

RELATED ART DOCUMENTS

Patent Documents

[Patent Document 1]
Japanese Unexamined Patent Application, First Publication No. 2016-115412

SUMMARY OF INVENTION

Problems to be Solved by the Invention

In a general vehicle lighting apparatus, by a projection lens, a light distribution pattern that is wide in a horizontal direction desirable for a vehicle lighting apparatus is formed. In a vehicle lighting apparatus that includes a collimator lens, in a case where the light distribution pattern is formed by a projection lens, it is necessary to form a wide light distribution pattern by refracting parallel light, and there is a problem that a surface shape of a projection optical system and the entire structure of the vehicle lighting apparatus are complicated.

An object of an aspect of the present invention is to provide a collimator lens capable of forming a light distribution pattern preferable for a vehicle lighting apparatus, and a light radiation device and a vehicle lighting apparatus that include such a collimator lens.

Means for Solving the Problem

A collimator lens according to an aspect of the present invention is a collimator lens in use for a vehicle lighting apparatus, the collimator lens including: an incident surface on which the light that is radiated radially from a diffusion center is incident and which allows the incident light to become primary light that passes through an inside of the collimator lens; and an emission surface that is configured to emit secondary light parallel to an optical axis of the collimator lens, wherein a diffusion angle of a horizontal component of the primary light is larger than a diffusion angle of a component in a vertical direction of the primary light.

According to this configuration, the collimator lens refracts the light that is incident on the incident surface and makes the diffusion angle in the horizontal direction to be larger than the diffusion angle in the vertical direction. Thereby, the light distribution pattern of the light emitted as parallel light from the emission surface can be widened in the horizontal direction, and it is possible to form a light distribution pattern preferable for the vehicle lighting apparatus.

In the collimator lens described above, a vertical component of the incident surface may have a hyperbolic shape that is configured to match a hyperbolic focus with the diffusion center.

According to this configuration, since the vertical component of the incident surface has a hyperbolic shape in which the diffusion center is a hyperbolic focus, it is possible to allow the vertical component of the primary light to be parallel light. The collimator lens can prevent expansion in the vertical direction of the light distribution pattern by allowing the vertical component of the light to be the parallel light in the incident surface.

In the collimator lens described above, a horizontal component of the incident surface may have a hyperbolic shape that is configured to match a hyperbolic focus with the diffusion center in a vicinity of the optical axis of the collimator lens and have a shape in which the horizontal component of the incident surface is separated further rearward from the hyperbolic shape as the horizontal component of the incident surface is separated further outward in a horizontal direction from the optical axis of the collimator lens.

According to this configuration, since the horizontal component of the incident surface has a hyperbolic shape in which the diffusion center is the hyperbolic focus in the vicinity of the optical axis of the collimator lens, it is possible to allow the horizontal component of the primary light to be closer to parallel light in the vicinity of the optical axis of the collimator lens. Thereby, the density of a light flux emitted from the emission surface can be increased in the vicinity of the optical axis of the collimator lens, and it is possible to realize a light distribution pattern brightened in the vicinity of the middle in the horizontal direction. Further, according to the above configuration, the horizontal component of the incident surface is separated further rearward from the hyperbolic shape as it is separated further outward in the horizontal direction from the optical axis of the collimator lens. Thereby, the horizontal component of the primary light can enlarge the diffusion angle by being separated outward in the horizontal direction from the optical axis of the collimator lens. The collimator lens can realize a light distribution pattern appropriate for a vehicle by diffusing an outside region of the horizontal component of light and increasing the expansion in the horizontal direction of the light distribution pattern.

Further, a light radiation device according to another aspect of the present invention includes: the collimator lens described above; and a light source unit that has a light source main body and that is configured radiate light radially from the diffusion center.

According to this configuration, it is possible to provide a light radiation device that forms a light distribution pattern preferable for a vehicle lighting apparatus.

In the light radiation device described above, the light source unit may have the light source main body and an elliptical reflection surface that is configured to reflect the light radiated from the light source main body and that is configured radiate the light toward the collimator lens, the elliptical reflection surface may be configured in an elliptical shape with reference to a pair of elliptical focuses, the light source main body may be arranged at one of the pair of elliptical focuses, and another of the pair of elliptical focuses may function as the diffusion center.

According to this configuration, a Lambertian-emitted light beam radiated from the light source main body arranged at the one elliptical focus of the elliptical reflection surface can be condensed at the other elliptical focus and can enter the collimator lens at a narrower angle than that of the light radiated from the light source main body. Thereby, the light can efficiently enter the collimator lens, and a light intensity in the vicinity of the optical axis can be increased such that a high illuminance region is formed in the vicinity of the optical axis of the collimator lens.

A vehicle lighting apparatus according to still another aspect of the present invention includes: the light radiation device described above; and an image light formation device that is configured to modulate parallel light radiated from the light radiation device and that forms image light.

According to this configuration, by providing the image light formation device in a route of the light, the light distribution pattern radiated frontward can be changed over time. That is, according to this configuration, the vehicle lighting apparatus can perform an ADB (Adaptive Driving Beam) control.

Advantage of the Invention

According to the aspect of the present invention, it is possible to provide a collimator lens capable of forming a light distribution pattern preferable for a vehicle lighting apparatus, and a light radiation device and a vehicle lighting apparatus that include such a collimator lens.

DESCRIPTION OF THE EMBODIMENTS

Hereinafter, a vehicle lighting apparatus according to an embodiment of the present invention will be described with reference to the drawings.

In the drawings used in the following description, in order to make features easier to understand, feature parts may be enlarged for the sake of convenience, and dimensional ratios or the like of components are not always the same as the actual ones.

In the drawings used in the description of the present embodiment, an XYZ coordinate system may be used as a 3-dimensional orthogonal coordinate system. Hereinafter, in the XYZ coordinate system, a Z-axis direction is referred to as a vehicle frontward/rearward direction, an X-axis direction is referred to as a vehicle rightward/leftward direction, a Y-axis direction is referred to as a vehicle upward/downward direction, a +Z side is referred to as a vehicle frontward side, a −Z side is referred to as a vehicle rearward side, a +Y side is simply referred to as an upward side, and a −Y side is simply referred to as a downward side.

First Embodiment

Figure 1:
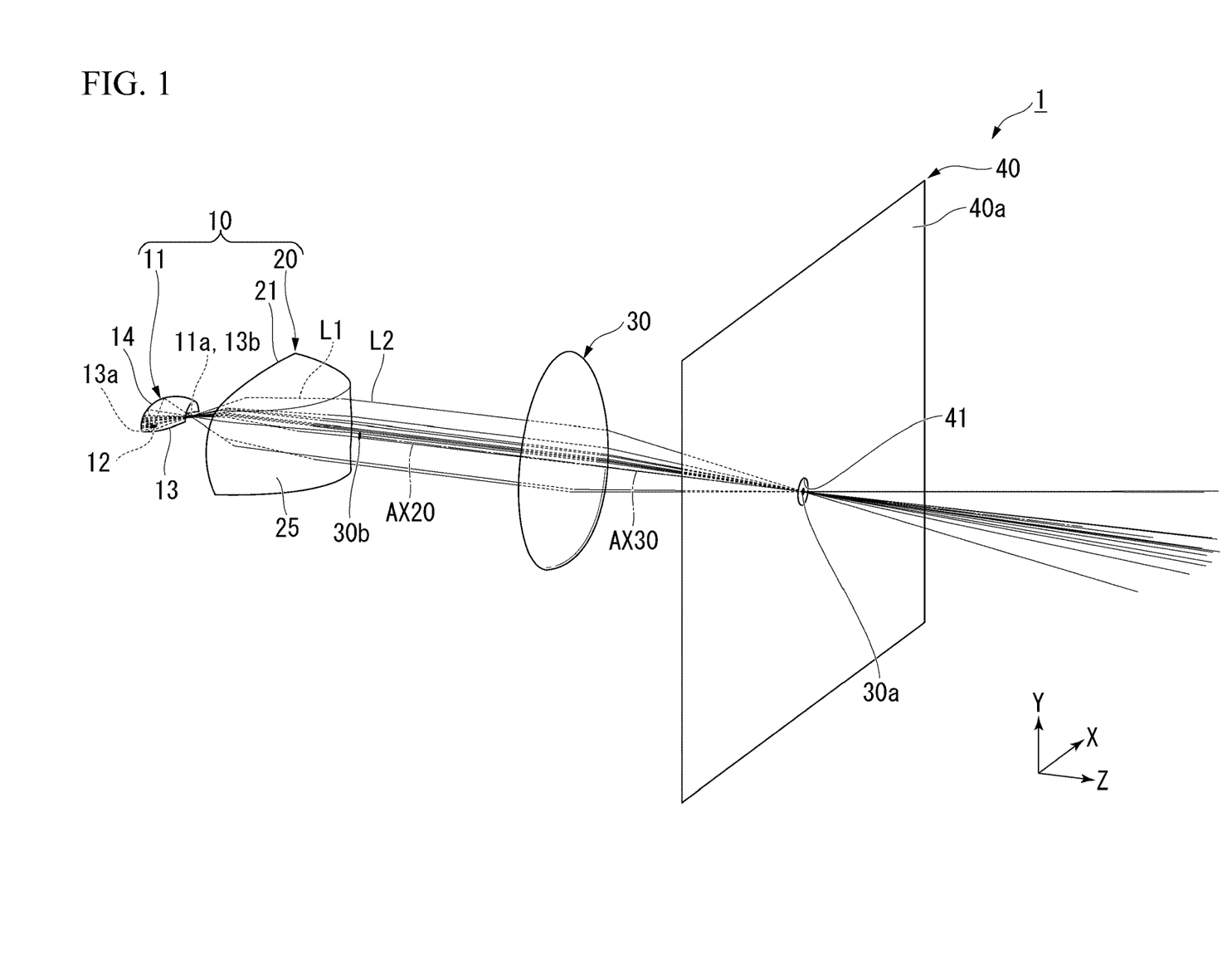
FIG. 1 is a perspective view schematically showing a vehicle lighting apparatus according to a first embodiment.
Figure 2:
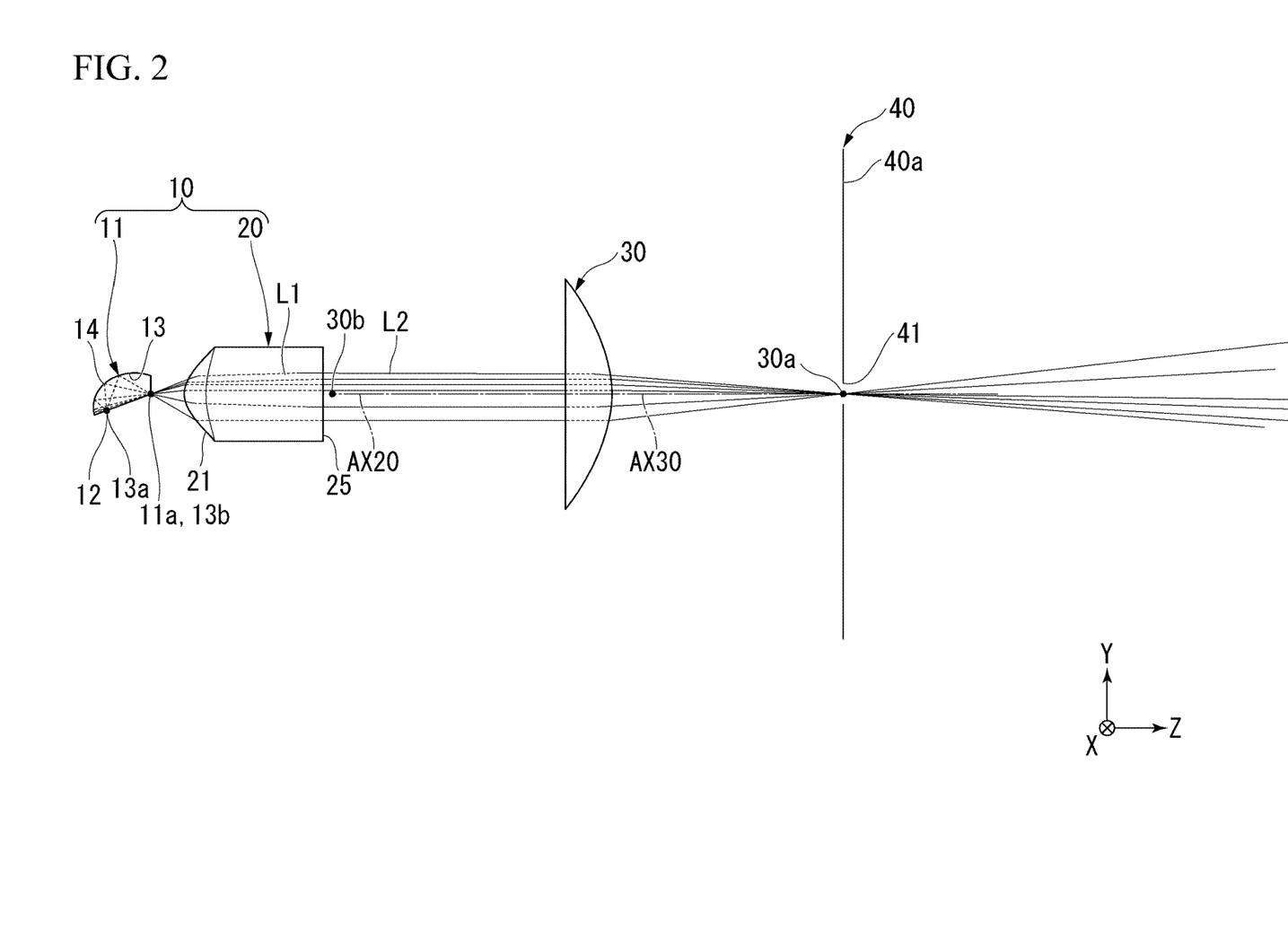
FIG. 2 is a side view schematically showing the vehicle lighting apparatus according to the first embodiment.
Figure 3:
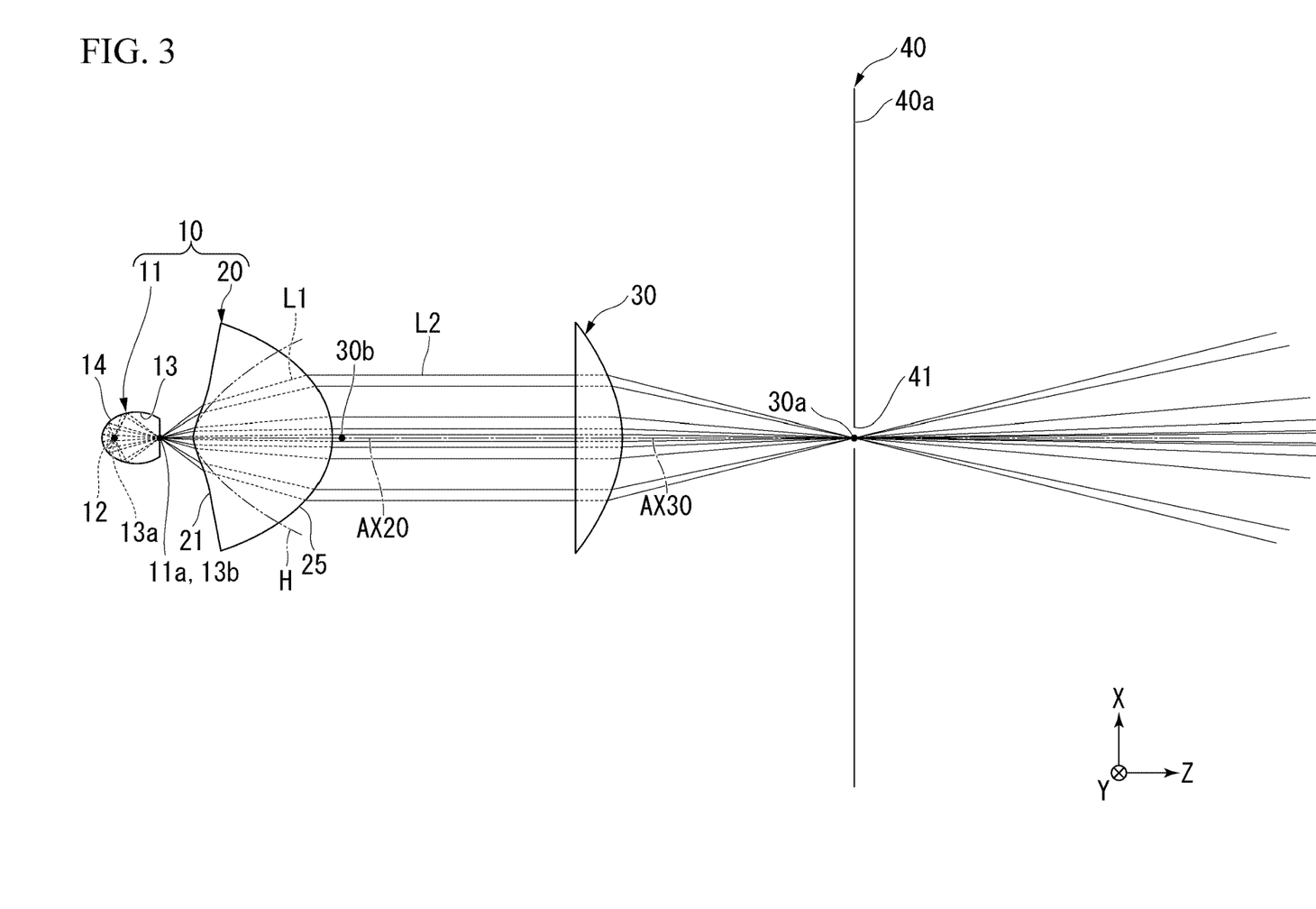
FIG. 3 is a plan view schematically showing the vehicle lighting apparatus according to the first embodiment.

FIG. 1, FIG. 2 and FIG. 3 are views schematically showing a vehicle lighting apparatus 1 according to a first embodiment, FIG. 1 is a perspective view, FIG. 2 is a side view, and FIG. 3 is a plan view. The vehicle lighting apparatus 1 of the present embodiment is mounted on a vehicle and irradiates a frontward direction (+Z direction) of the vehicle.

The vehicle lighting apparatus 1 includes a light radiation device 10, a condenser lens (first optical system) 30, and a cover member 40 in which an opening 41 is provided. Further, the vehicle lighting apparatus 1 may include an outer lens (not shown) at a frontward position of the cover member 40. In the vehicle lighting apparatus 1, parallel light is radiated from the light radiation device 10. The parallel light is condensed by the condenser lens 30, passes through the opening 41 of the cover member 40, and is radiated frontward.

<Light Radiation Device>

The light radiation device 10 has a light source main body 12. The light radiation device 10 radiates light radiated from the light source main body 12 toward the condenser lens 30 as parallel light. The light radiation device 10 has a light source unit 11 that radiates light radially from a diffusion center 11a and a collimator lens (second optical system) 20 that allows the light radiated from the light source unit 11 to be parallel light. Further, the light source unit 11 includes the light source main body 12 and a reflection member 14.

The light source main body 12 radiates a Lambertian-emitted light beam with a central axis facing upward. The Lambertian-emitted light beam radiated from the light source main body 12 is reflected frontward by the reflection member 14. A light emitting diode (LED) light source or a laser light source can be employed as the light source main body 12.

The reflection member 14 has an elliptical reflection surface 13 that reflects the light radiated from the light source main body 12 and that radiates the light toward the collimator lens 20. That is, the light source unit 11 has the elliptical reflection surface 13. The elliptical reflection surface 13 covers the light source main body 12 from the upper side. The elliptical reflection surface 13 includes an elliptical sphere shape obtained by an elliptical shape with reference to a pair of elliptical focuses 13a and 13b being rotated with reference to a long axis that passes through the pair of elliptical focuses 13a and 13b.

The light source main body 12 is arranged at a first elliptical focus 13a located at a rearward position among the pair of elliptical focuses 13a and 13b. Due to a property of an ellipse, the light radiated from the first elliptical focus 13a that is one of the elliptical focuses is reflected by the elliptical reflection surface 13 and is condensed to a second elliptical focus 13b that is another of the elliptical focuses. Accordingly, the light radiated from the light source main body 12 is condensed on the second elliptical focus 13b and is radiated radially toward the collimator lens 20 using the second elliptical focus 13b as the diffusion center 11a. The second elliptical focus 13b functions as the diffusion center 11a of the light source unit 11.

According to the present embodiment, the light source unit 11 arranged at the first elliptical focus 13a has the light source main body 12 and the elliptical reflection surface 13 that reflects the light radiated from the light source main body 12 and that radiates the light toward the collimator lens 20. Accordingly, it is possible to allow the Lambertian-emitted light beam radiated from the light source main body 12 to be incident on the collimator lens 20 at a narrow diffusion angle (narrow angle) at the second elliptical focus 13b. Thereby, it is possible to allow the light to be efficiently incident on the collimator lens 20, and it is possible to increase a light intensity in the vicinity of an optical axis AX20 such that a high illuminance region is formed in the vicinity of the optical axis AX20 of the collimator lens 20. Further, by employing such a collimator lens 20, it is possible to obtain a light emission having an illuminance gradient in which illuminance decreases at a more outward position from the high illuminance region.

The collimator lens 20 refracts the light radiated from the diffusion center 11a of the light source unit 11 to form parallel light. The collimator lens 20 is located at a frontward position of the light source unit 11. The collimator lens 20 has an incident surface 21 and an emission surface 25. The incident surface faces the light source unit 11 from the front. The light radiated from the light source unit 11 is incident on the incident surface 21. The incident surface 21 allows the incident light to become primary light L1 that passes through the inside of the collimator lens 20. The emission surface 25 faces the condenser lens 30. The emission surface 25 refracts the light (primary light L1) that proceeds through the inside of the collimator lens 20 and emits secondary light L2 toward the condenser lens 30. The secondary light L2 is light parallel to the optical axis AX20 of the collimator lens 20 (that is, parallel light).

The light emitted from the light source unit 11 is refracted at the incident surface 21 in a direction in which the light approaches the optical axis AX20 of the collimator lens 20 and becomes the primary light L1 that passes through the inside of the collimator lens 20. A diffusion angle of a horizontal component of the primary light L1 shown in FIG. 3 is larger than a diffusion angle of a vertical component of the primary light L1 shown in FIG. 2. That is, an angle formed between the horizontal component of the primary light L1 and the optical axis AX20 is larger than an angle formed between the vertical component of the primary light L1 and the optical axis AX20.

More specifically, in the present embodiment, the vertical component of the primary light L1 is substantially parallel to the optical axis AX20. That is, the angle formed between the vertical component of the primary light L1 and the optical axis AX20 is substantially 0°. On the other hand, the horizontal component of the primary light L1 is inclined with respect to the optical axis AX20 in a direction in which the horizontal component is separated from the optical axis AX20 as it goes frontward. That is, the horizontal component of the primary light L1 is diffused with respect to the optical axis AX20.

The horizontal component of the light means a travel direction of light in a plane parallel to a horizontal surface (X-Z plane), and the vertical component of the light means a travel direction of light in a plane parallel to a vertical surface (Y-Z plane).

According to the present embodiment, the collimator lens 20 refracts the light that is incident on the incident surface 21 such that the diffusion angle in the horizontal direction is increased relative to the vertical direction. Thereby, a light distribution pattern of the light emitted as the parallel light at the emission surface 25 can be widened in the horizontal direction relative to the vertical direction, and it is possible to form a light distribution pattern preferable for a vehicle lighting apparatus.

A vertical component and part of a horizontal component of the incident surface 21 of the collimator lens 20 have a hyperbolic shape. In general, a hyperbolic curve is constituted of a pair of continuous curves. Further, the hyperbolic curve constituted of the pair of curves is drawn with reference to a pair of focuses. Each of the pair of focuses of the hyperbolic curve is arranged at an inner side of the curve. The hyperbolic shape means a curve shape of one of the pair of curves. Further, a hyperbolic focus means one of the pair of focuses with reference to the hyperbolic curve, which is not surrounded by a curve that constitutes a hyperbolic shape. The hyperbolic focus is arranged on the optical axis AX20 of the collimator lens 20 behind the incident surface 21.

As shown in FIG. 2, the vertical component of the incident surface 21 has a hyperbolic shape that matches the hyperbolic focus with the diffusion center 11a of the light source unit 11. By appropriately setting a parameter of the hyperbolic shape in accordance with a refractive index of the collimator lens 20, due to a property of the hyperbolic shape, the light radiated from the hyperbolic focus is refracted at the incident surface 21 having the hyperbolic shape and becomes parallel light. Accordingly, in the present embodiment, it is possible to allow the vertical component of the primary light L1 refracted at the incident surface 21 to become parallel to the optical axis AX20. Thereby, it is possible for the collimator lens 20 to prevent the expansion in the vertical direction of the light distribution pattern radiated frontward.

Since the vertical component of the primary light L1 is parallel to the optical axis AX20 in the incident surface 21, there is no need to refract the light at the emission surface 25. Accordingly, the vertical component of the emission surface 25 has a linear shape that is orthogonal to the optical axis AX20.

As shown in FIG. 3, the horizontal component of the incident surface 21 has a hyperbolic shape H that matches the hyperbolic focus with the diffusion center in the vicinity of the optical axis AX20 and has a shape that is separated further rearward from the hyperbolic shape H as it is separated further outward in the horizontal direction from the optical axis AX20. As described above, by appropriately setting the parameter of the hyperbolic shape in accordance with the refractive index of the collimator lens 20, due to the property of the hyperbolic shape, the light radiated from the hyperbolic focus is refracted at the incident surface 21 in the vicinity of the optical axis AX20 and becomes parallel light. Accordingly, in the present embodiment, it is possible to allow the horizontal component of the primary light L1 refracted at the incident surface 21 to be parallel to the optical axis AX20 in the vicinity of the optical axis AX20. Thereby, in the vicinity of the optical axis AX20, it is possible to increase the density of the light flux emitted from the emission surface 25, and it is possible to realize a light distribution pattern brightened in the vicinity of the middle in the horizontal direction. Further, according to the present embodiment, the horizontal component of the incident surface 21 is separated further rearward from the hyperbolic shape as it is separated further outward in the horizontal direction from the optical axis AX20. Thereby, it is possible for the horizontal component of the primary light L1 to expand the diffusion angle by being separated outward in the horizontal direction from the optical axis AX20. Accordingly, the collimator lens 20 can increase the expansion in the horizontal direction of the light distribution pattern and realize a light distribution pattern appropriate for the vehicle by diffusing an outer region of the horizontal component of the light.

The horizontal component of the primary light L1 advances in a direction inclined with respect to the optical axis AX20 at the incident surface 21, is refracted at the emission surface 25, and is radiated toward the condenser lens 30 as the secondary light L2 that is parallel to the optical axis AX20. The horizontal component of the emission surface 25 has a convex shape that protrudes toward the condenser lens 30.

According to the present embodiment, the collimator lens 20 refracts the light that is incident on the incident surface 21 and increases the diffusion angle in the horizontal direction relative to the diffusion angle in the vertical direction. Thereby, the light distribution pattern of the light emitted as parallel light from the emission surface 25 can be widened in the horizontal direction, and it is possible to form a light distribution pattern preferable for the vehicle lighting apparatus 1.

The vertical component of the incident surface 21 means a cross-sectional shape along the vertical direction of the incident surface 21. In other words, the vertical component of the incident surface 21 means a surface shape of the incident surface 21 in a cross-section parallel to a vertical plane (Y-Z plane) parallel to the optical axis AX20. Similarly, the horizontal component of the incident surface 21 means a cross-sectional shape along the horizontal direction of the incident surface 21. In other words, the horizontal component of the incident surface 21 means a surface shape of the incident surface 21 in a cross-section parallel to a horizontal plane (X-Z plane).

<Condenser Lens (First Optical System)>

The condenser lens 30 is arranged at a frontward position of the light radiation device 10. The condenser lens 30 functions as a projection lens. An optical axis AX30 of the condenser lens 30 is matched with the optical axis AX20 of the collimator lens 20 of the light radiation device 10. The condenser lens 30 condenses the light radiated from the light radiation device 10. The condenser lens 30 forms condensing points 30a and 30b at frontward and rearward positions. Here, one of the pair of condensing points 30a and 30b arranged at a frontward position of the condenser lens 30 is referred to as a frontward condensing point 30a. Another of the pair of condensing points 30a and 30b arranged at a rearward position of the condenser lens 30 is referred to as a rearward condensing point 30b. The secondary light L2 as parallel light radiated from the light radiation device 10 is condensed to the frontward condensing point 30a by the condenser lens 30.

In the present embodiment, the pair of condensing points 30a and 30b are matched with an optical focus of the condenser lens 30. However, the condensing point means a point to which the condenser lens 30 can most condense the light and does not necessarily have to be a focus in a strict sense.

The condenser lens 30 may be a condenser lens that does not have a strict focus as long as the condenser lens 30 can condense light, and in that case, a point to which the light is most condensed is defined as the condensing point.

Figure 4:
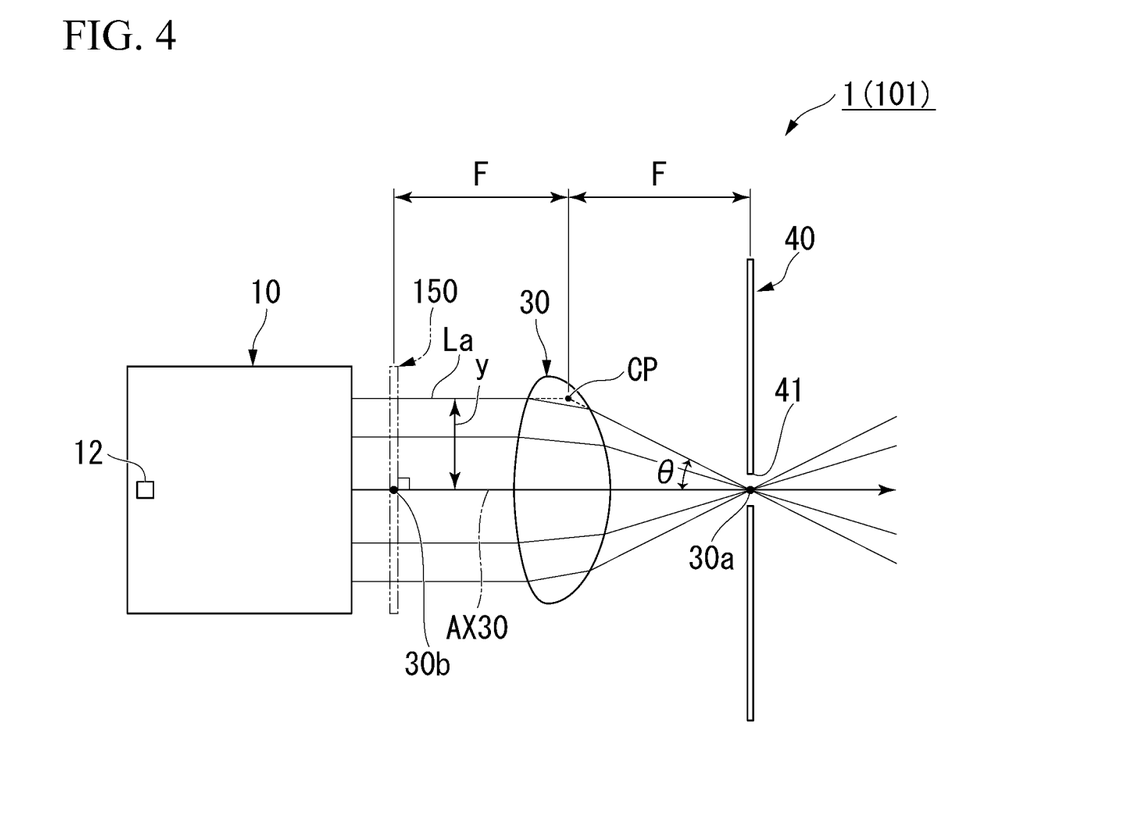
FIG. 4 is a schematic view of a vehicle lighting apparatus of the first embodiment and a second embodiment.

FIG. 4 is a schematic view of the vehicle lighting apparatus 1 of the present embodiment. Light La that passes through a point separated from the optical axis AX30 of the condenser lens 30 by a distance y in a direction orthogonal to the optical axis AX30 and that is incident on the condenser lens 30 is incident on a focus (condensing point 30a) of the condenser lens 30, when an effective focal distance of the condenser lens 30 is F, at an angle $\theta = \tan^{-1}(y/F)$ with respect to the optical axis AX30 and is then projected toward a vehicle frontward direction. The effective focal distance F is a distance to a focus (condensing points 30a and 30b) from an intersection point CP in a lens of extension lines of optical paths before entering and after exiting the condenser lens 30.

According to the equation described above, a light distribution pattern of a surface distribution appropriate for the vehicle formed as parallel light by the collimator lens 20 is converted into light having a predetermined angle and is projected to a vehicle frontward direction.

In the present embodiment, the condenser lens 30 is a convex lens in which a rearward surface is a flat surface and a frontward surface is a convex surface. However, the condenser lens 30 is an example of a first optical system that condenses light to the frontward condensing point 30a, and the configuration of the condenser lens 30 is not limited to the present embodiment. For example, as the first optical system, instead of the condenser lens 30, a plurality of optical systems may be configured to be aligned in a frontward/rearward direction such that optical axes of the plurality of optical systems are matched with each other. FIG. 4 is a schematic view, and the frontward surface and the rearward surface of the condenser lens 30 are shown as convex surfaces. In this way, the frontward surface and the rearward surface of the condenser lens 30 may be a convex surface.

<Cover Member>

The cover member 40 has a plate shape. The cover member 40 is arranged at a frontward position of the condenser lens 30. The cover member 40 overlaps at least part of the condenser lens 30 when seen from the frontward direction. That is, the cover member 40 covers the condenser lens 30 from the frontward direction. A frontward surface 40a of the cover member 40 functions as a design surface. That is, the frontward surface 40a of the cover member 40 makes it difficult to see an internal structure including the condenser lens 30 and the light radiation device 10 when seen from the frontward direction. Thereby, the cover member 40 enhances a design property of the vehicle lighting apparatus 1.

The opening 41 that penetrates in the frontward/rearward direction is provided in the cover member 40. In the present embodiment, the opening 41 is a pinhole. The opening 41 may be, for example, a slit that extends in one direction. Further, a shape of the opening 41 may be a shape widened in the horizontal direction in conformity with a shape of a light distribution pattern radiated frontward.

The opening 41 is arranged on the optical axis AX30 of the condenser lens 30. The parallel light (secondary light L2) radiated from the light radiation device 10 is refracted by the condenser lens 30 and is condensed onto the optical axis AX30 of the condenser lens 30. Accordingly, it is possible to allow light having a narrowed passing range to pass through the opening 41 by arranging the opening 41 on the optical axis AX30 of the condenser lens 30. That is, it is possible make the opening 41 small and make it difficult to see the internal structure of the vehicle lighting apparatus 1 by arranging the opening 41 on the optical axis AX30 of the condenser lens 30.

Further, in the present embodiment, the opening 41 is located at the frontward condensing point 30a of the condenser lens 30. The light refracted by the condenser lens 30 is most condensed to the frontward condensing point 30a.

It is possible to make the opening 41 to be the smallest one by arranging the opening 41 at the frontward condensing point 30a, and as a result, it is possible to enhance an effect of the cover member 40 making it difficult to see the internal structure of the vehicle lighting apparatus 1.

According to the present embodiment, the cover member 40 that overlaps at least part of the condenser lens 30 is provided at a frontward position of the condenser lens 30. Therefore, the internal structure is shielded from the frontward direction, and it is possible to realize the vehicle lighting apparatus 1 having an enhanced design property. Further, the opening 41 located on the optical axis AX30 of the condenser lens 30 is provided in the cover member 40. The light parallelized by the light radiation device 10 enters the condenser lens 30, is condensed on the optical axis AX30, and passes through the opening 41. Accordingly, the light that radiates the frontward direction is not shielded by the cover member 40.

Further, according to the present embodiment, since the frontward surface 40a of the cover member 40 functions as a design surface, the size of the design surface can be determined without being restricted by the size of the condenser lens 30. Accordingly, it is possible to provide the vehicle lighting apparatus 1 having a compact appearance and an enhanced design property.

Further, according to the present embodiment, a distribution having an illuminance gradient is generated in the parallel light (secondary light L2) radiated by the light radiation device 10 by appropriately designing the incident surface 21 and the emission surface 25 of the collimator lens 20. Thereby, the vehicle lighting apparatus 1 can form a light distribution pattern in which the illuminance decreases at a further outward position from the high illuminance region (refer to FIG. 5 and FIG. 6).

In the present embodiment, the vehicle lighting apparatus 1 has the condenser lens 30 and the cover member 40 in which the opening 41 provided. However, the vehicle lighting apparatus 1 may not have the condenser lens 30 and the cover member 40 as long as the light that is made parallel light by the collimator lens 20 is radiated frontward.

Second Embodiment

Next, a vehicle lighting apparatus 101 of a second embodiment will be described with reference to FIG. 4. The vehicle lighting apparatus 101 of the second embodiment is mainly distinguished in that the vehicle lighting apparatus 101 includes an image light formation device 150 compared to the embodiment described above. The same component as that of the embodiment described above is given by the same reference numeral and description thereof will be omitted.

The vehicle lighting apparatus 101 includes the image light formation device 150 that forms image light in addition to the light radiation device 10, the condenser lens (first optical system) 30 and the cover member 40. The image light formation device 150 modulates light and forms image light. In the present embodiment, the image light formation device 150 is a transmission-type liquid crystal panel that forms image light when light passes through the image light formation device 150. However, the image light formation device 150 may be a reflection-type liquid crystal panel or may be a DMD (Digital Mirror Device) in which a plurality of pivotable micromirrors are arranged in an array (matrix) and which forms image light when reflecting light. It is possible to allow the light that is incident on the condensing optical system to become image light by arranging the image light formation device 150 in a route from the light source main body 12 to the condenser lens 30, and a light distribution pattern radiated frontward can be changed over time. That is, according to this configuration, the vehicle lighting apparatus can perform an ADB (Adaptive Driving Beam) control.

Hereinafter, in the description of the present embodiment, the image light formation device is referred to as a liquid crystal panel 150.

The liquid crystal panel 150 is arranged between the light radiation device 10 and the condenser lens 30. That is, the image light is formed by allowing part of the light that is made parallel light by the light radiation device 10 to pass through the liquid crystal panel 150 and shielding another part of the light. Since it is possible to make the light that passes through the liquid crystal panel 150 to be parallel light by arranging the liquid crystal panel 150 between the light radiation device 10 and the condenser lens 30, it is possible to form clearer image light. That is, according to the present embodiment, it is possible to form a clearer light distribution pattern by forming the image light by the liquid crystal panel 150 using the parallel light radiated from the light radiation device 10.

Further, a liquid crystal panel that diffuses the passing light may be used as the liquid crystal panel 150. The diffused light is not condensed to the frontward condensing point 30a by the condenser lens 30.

Accordingly, the diffused light does not easily pass through the opening 41 of the cover member 40, and it is possible to make the light distribution pattern radiated frontward clear.

The liquid crystal panel 150 is arranged to be orthogonal to the optical axis AX30 of the condenser lens 30 at the rearward condensing point 30b of the condenser lens 30. By arranging the liquid crystal panel 150 at the rearward condensing point 30b, even in a case where non-parallel light is included in the light radiated from the light radiation device 10, it is possible to form a clear light distribution pattern.

In general, the liquid crystal element used in the liquid crystal panel is known to have a transmissive performance changed depending on an incident angle of light. That is, the liquid crystal element has a property in which the liquid crystal element has the highest contrast (light-dark transmissivity ratio) with respect to the light from a specified angle (for example, a direction orthogonal to the liquid crystal panel), and the contrast is decreased as the angle is deviated from the specified angle. Therefore, when the light that is incident on the liquid crystal element has an angular distribution, the light-dark transmissivity ratio of the entire image light may be also decreased in accordance with a decrease in contrast of a region in which the light most deviated from the specified angle is incident.

According to the present embodiment, by arranging the liquid crystal panel 150 to be orthogonal to the parallel light, it is possible to use only the light having the incident angle with the highest contrast of the liquid crystal panel 150, and it is possible to increase the light-dark transmissivity ratio of the image light. That is, according to the present embodiment, it is possible to provide the vehicle lighting apparatus 101 that forms a clear light distribution pattern.

In this way, the liquid crystal panel 150 exhibits a high performance when parallel light is incident on the liquid crystal panel 150. Accordingly, the vehicle lighting apparatus 101 of the present embodiment is most effective when the liquid crystal panel 150 is used as the image light formation device.

According to the present embodiment, in addition to the above effect obtained by providing the liquid crystal panel 150, it is possible to provide the same effects as those of the first embodiment.

EXAMPLES

Hereinafter, the effects of the present invention will be made clearer by the examples. The present invention is not limited to the following examples and can be appropriately modified and implemented without departing from the scope of the invention.

[Light Distribution Pattern Corresponding to First Embodiment]

Figure 5:
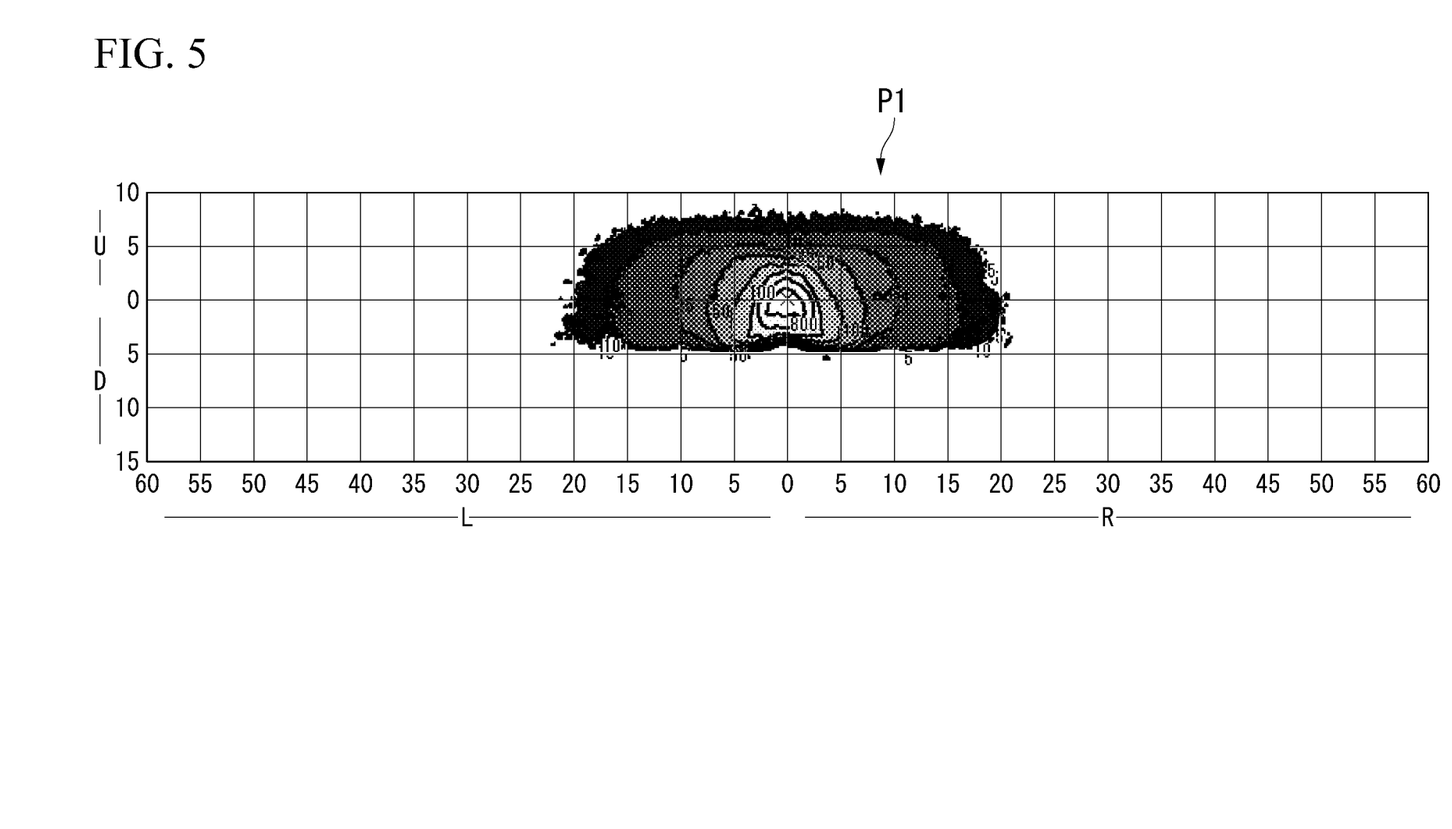
FIG. 5 is a view showing a simulation result of a light distribution pattern of the first embodiment.

FIG. 5 shows a simulation result of a light distribution pattern P1 in the vehicle lighting apparatus 1 of the first embodiment described above with respect to a virtual vertical screen facing the vehicle lighting apparatus 1. In the simulation, an effective lens height of the condenser lens 30 is 30 mm, and a dimension in the vertical direction of the cover member 40 is 10 mm.

As shown in FIG. 5, in the light distribution pattern P1, a high illuminance band is provided at a center, the width in the horizontal direction is wider than that in the vertical direction, and the light distribution pattern P1 is formed in a shape preferable as a light distribution pattern of the vehicle lighting apparatus. Further, when a total light flux of the light distribution pattern P1 is confirmed, efficiency of utilization of the light is 50% or more even in a case where light loss in an outer lens (omitted in FIG. 1 to FIG. 3) is considered. Therefore, according to the vehicle lighting apparatus 1 of the first embodiment, it is possible to form a preferable light distribution pattern P1 with high efficiency and enhanced design properties. The efficiency of utilization of the light is an index that represents a ratio of a light flux radiated frontward to the total light flux radiated from the light source main body using a percentage.

[Light Distribution Pattern Corresponding to Second Embodiment]

Figure 6:
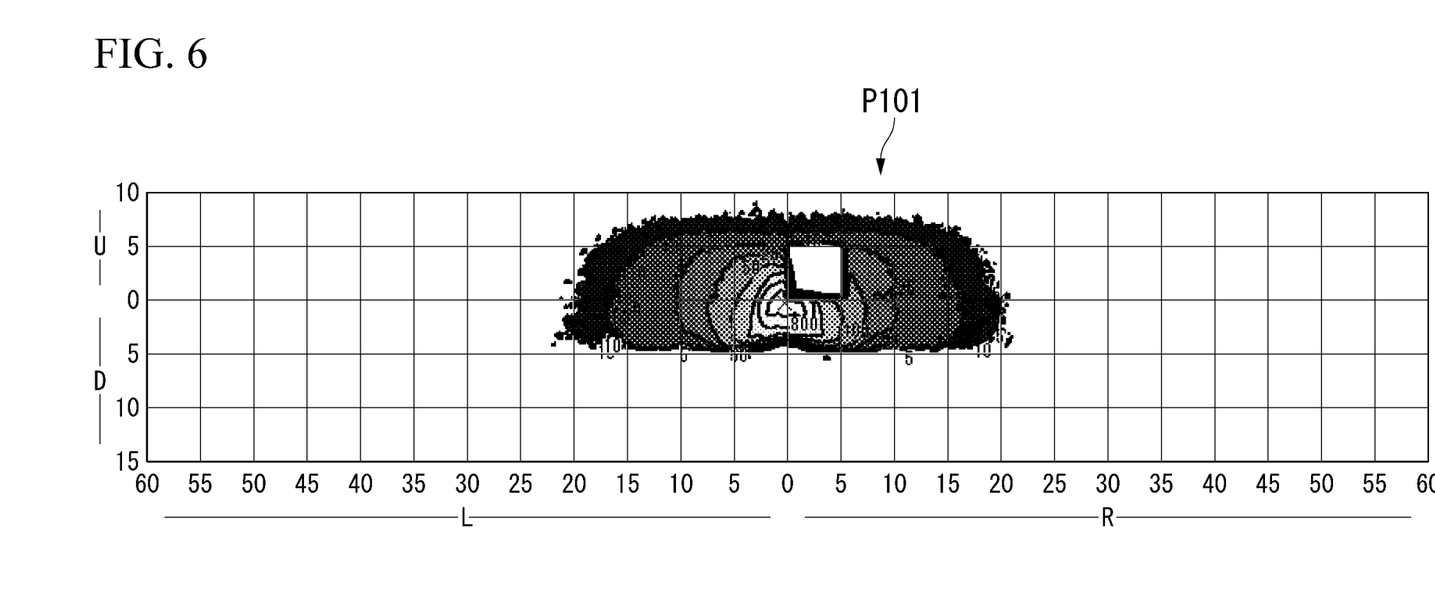
FIG. 6 is a view showing a simulation result of a light distribution pattern of the second embodiment.

FIG. 6 shows a simulation result of the light distribution pattern P101 in the vehicle lighting apparatus 101 of the second embodiment described above with respect to a virtual vertical screen facing the vehicle lighting apparatus 101.

In the simulation, the liquid crystal panel 150 shields some of the passing light (a right upper region of the center in the light distribution pattern P101).

As shown in FIG. 5, the light distribution pattern P101 corresponding to the second embodiment provides the same effects as those of the light distribution pattern P1 corresponding to the first embodiment and is able to form a region to which the light is not partially radiated. That is, according to the light distribution pattern P101 corresponding to the second embodiment, it is possible to clearly perform the ADB control of partially masking the radiation of light.

While various embodiments of the present invention have been described, the configurations, the combinations of the configurations and the like in the embodiments are examples, and additions, omissions, and substitutions of the configurations and other modifications can be made without departing from the scope of the invention. Further, the present invention is not limited by the embodiment.

DESCRIPTION OF THE REFERENCE SYMBOLS 1, 101 Vehicle lighting apparatus
10 Light radiation device
11 Light source unit
11a Diffusion center
12 Light source main body
13 Elliptical reflection surface
13a, 13b Elliptical focus
20 Collimator lens (second optical system)
21 Incident surface
25 Emission surface
30a Frontward condensing point (condensing point)
30b Rearward condensing point (condensing point)
150 Image light formation device (liquid crystal panel)
AX20, AX30 Optical axis
L1 Primary light
L2 Secondary light

The invention claimed is:
1. A collimator lens in use for a vehicle lighting apparatus, the collimator lens comprising:
    an incident surface on which the light that is radiated radially from a diffusion center is incident and which allows the incident light to become primary light that passes through an inside of the collimator lens; and
    an emission surface that is configured to emit secondary light parallel to an optical axis of the collimator lens,
    wherein a diffusion angle of a horizontal component of the primary light is larger than a diffusion angle of a component in a vertical direction of the primary light, and
    a horizontal component of the incident surface has a hyperbolic shape that is configured to match a hyperbolic focus with the diffusion center in a vicinity of the optical axis of the collimator lens and has a shape in which the horizontal component of the incident surface is separated further rearward from the hyperbolic shape as the horizontal component of the incident surface is separated further outward in a horizontal direction from the optical axis of the collimator lens.
2. The collimator lens according to claim 1,
    wherein a vertical component of the incident surface has a hyperbolic shape that is configured to match a hyperbolic focus with the diffusion center.
3. A light radiation device comprising:
    the collimator lens according to claim 1; and
    a light source unit that has a light source main body and that is configured radiate light radially from the diffusion center.
4. The light radiation device according to claim 3,
    wherein the light source unit has the light source main body and an elliptical reflection surface that is configured to reflect the light radiated from the light source main body and that is configured radiate the light toward the collimator lens,
    the elliptical reflection surface is configured in an elliptical shape with reference to a pair of elliptical focuses, the light source main body is arranged at one of the pair of elliptical focuses, and another of the pair of elliptical focuses functions as the diffusion center.

5. A vehicle lighting apparatus comprising:

the light radiation device according to claim 3; and an image light formation device that is configured to modulate parallel light radiated from the light radiation device and that forms image light.

6. A vehicle lighting apparatus comprising:

the light radiation device according to claim 3; and a first optical system that is arranged at a frontward position of the light radiation device and that projects light toward a vehicle frontward direction.

7. The vehicle lighting apparatus according to claim 6, wherein the first optical system is a condenser lens.

8. A light radiation device comprising:

the collimator lens according to claim 2; and a light source unit that has a light source main body and that is configured radiate light radially from the diffusion center.

9. A vehicle lighting apparatus comprising:

the light radiation device according to claim 8; and a first optical system that is arranged at a frontward position of the light radiation device and that projects light toward a vehicle frontward direction.

10. The vehicle lighting apparatus according to claim 9, wherein the first optical system is a condenser lens.

11. The vehicle lighting apparatus according to claim 5, wherein the image light formation device is any one of a transmission-type liquid crystal panel, a reflection-type liquid crystal panel, and a DMD in which a plurality of pivotable micromirrors are arranged in an array (matrix) and which forms image light when reflecting light.

12. A vehicle lighting apparatus comprising:

the light radiation device according to claim 4; and an image light formation device that is configured to modulate parallel light radiated from the light radiation device and that forms image light.

13. The vehicle lighting apparatus according to claim 12, wherein the image light formation device is any one of a transmission-type liquid crystal panel, a reflection-type liquid crystal panel, and a DMD in which a plurality of pivotable micromirrors are arranged in an array (matrix) and which forms image light when reflecting light.

14. The vehicle lighting apparatus according to claim 6, wherein an image light formation device that modulates parallel light radiated from the light radiation device and that forms image light is provided between the condenser lens and the light radiation device.

15. The vehicle lighting apparatus according to claim 14, wherein the image light formation device is a transmission-type liquid crystal panel.

16. The vehicle lighting apparatus according to claim 15, wherein a cover member that includes an opening through which light emitted from the condenser lens is capable of passing is provided at a frontward position of the condenser lens.

* * * * *